May 30, 1939.  J. H. GETTIG ET AL  2,160,586
TUBE WELDING
Filed Sept. 10, 1937  3 Sheets-Sheet 1
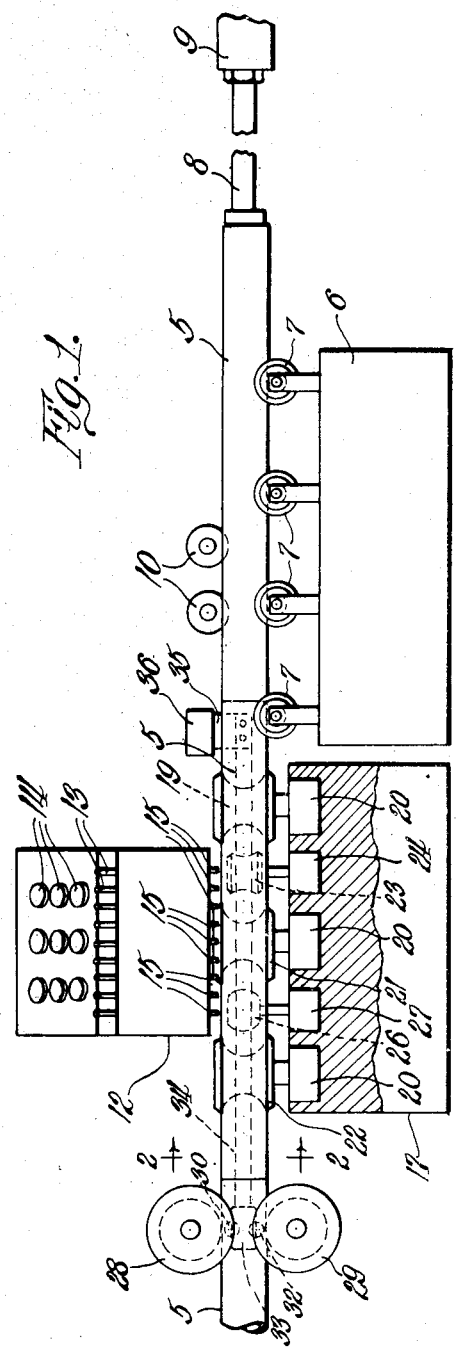
Inventors.
Joseph H. Gettig
George Spatta
By Walter E. Schirmer
Attys.

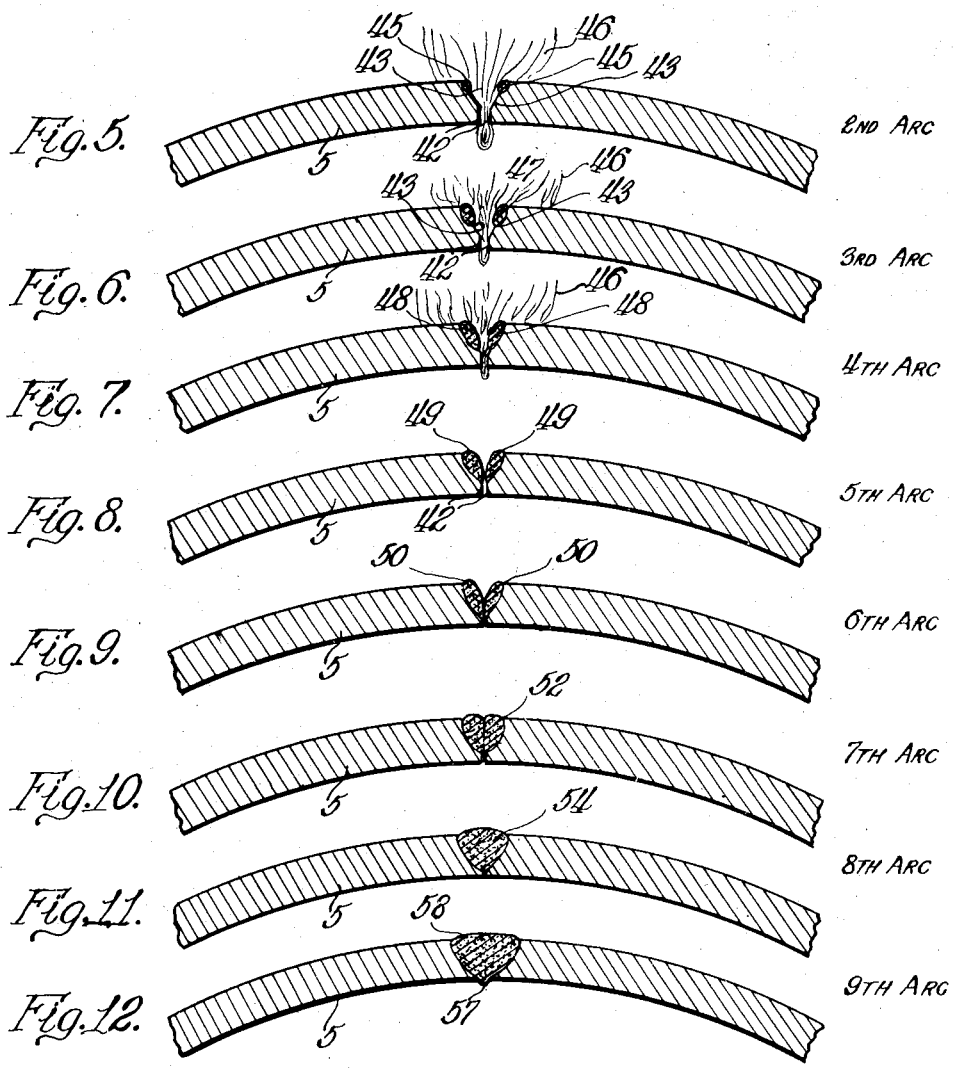

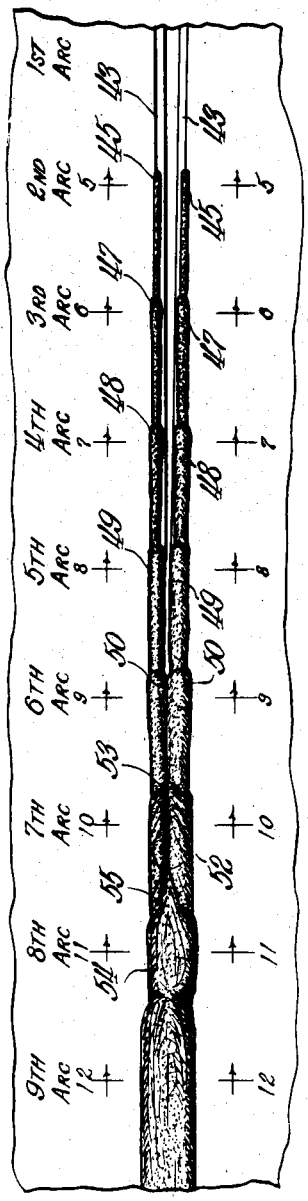
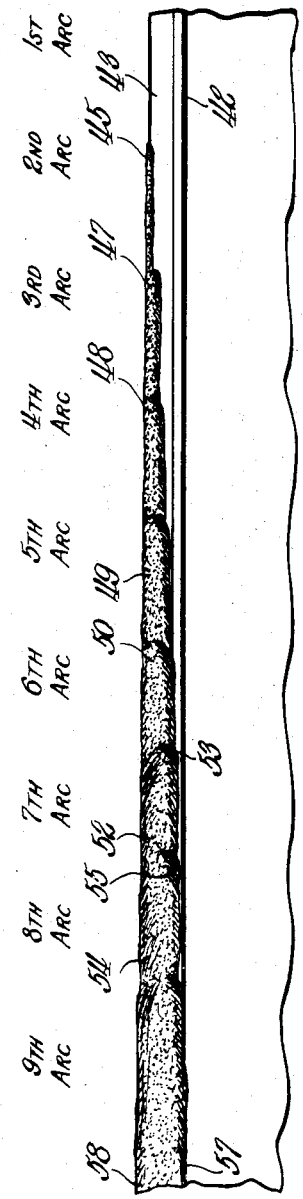

Patented May 30, 1939

2,160,586

UNITED STATES PATENT OFFICE 2,160,586

TUBE WELDING

Joseph H. Gettig and George Spatta, Buchanan, Mich., assignors to Clark Equipment Company, Buchanan, Mich., a corporation of Michigan Application September 10, 1937, Serial No. 163,191

5 Claims. (Cl. 219—10)

This invention relates to tube welding, and more particularly is directed to a process of and apparatus for welding tubing formed from strip stock. In particular, the present invention concerns the forming of tubular blanks from flat rectangular strip stock which will have a welded joint of sufficient strength to withstand subsequent forging and rolling operations.

It is essential, in order to practice the welding of strip stock into tubular form economically, to obtain as high a rate of welding speed as is consistent with the forming of a good weld having full depth penetration throughout the cleft. The welding speed, however, must be maintained within the limits of welding capacity of the particular type of welding employed. It has been therefore an object of the present invention to so design the apparatus and so carry out the welding process as to obtain the highest degree of efficiency.

In order to increase the welding speed, we propose to employ an atomic hydrogen multiple-arc head, which has been developed recently. This head provides spaced pairs of tungsten electrodes having the respective pairs of arcing tips offset longitudinally of the cleft, whereby an S-shaped arc is produced in which the major portion of the arc lies in the cleft. The arc also forms a downwardly directed arch or fan portion, disposed in the longitudinal plane of the cleft. Hydrogen directed at low velocity into the arc is broken down into atomic hydrogen, and in recombining to form molecular hydrogen produces an intense heat. The use of such a head is of distinct advantage in raising the welding speed by reason of the intense heat developed, and also in providing a reducing atmosphere or bath of hydrogen over the surfaces being welded, which prevents slag or oxide formations.

However, such a head alone is not sufficient, since the manner in which the heat is directed unto the surfaces to be welded is also a critical factor affecting the success of the welding process. It has been proposed heretofore to employ atomic hydrogen welding heads for this purpose in one of two ways. One scheme employed comprised the insertion of a shoe or mandrel within the tube beneath the welding head, whereby the molten metal on the cleft surfaces would not drop through into the tube, but would be supported on the shoe until the two edges were bridged by molten metal and the metal had cooled into solid condition.

The other method, which has been employed to a considerable extent, comprises striking the arc in the open cleft so that the heat is applied to the facing cleft surfaces, then holding these surfaces in such position that the molten metal from the two surfaces contacts and forms a self supporting molten capillary bridge which forms the weld when the two edges are pressed toward each other. The speed of melting, the speed of the tube and the spacing of the edges is so correlated that the liquid bridge of metal between the two edges is sustained until cooling occurs as the edges are pressed together.

However, we have found that this particular method does not work out advantageously with relatively heavy gauge stock, such as ¾" plate and thicker. It appears that an increased number of arcs is necessary, and that it is also necessary to provide a different mode of applying the heat to the cleft edges. We have also found that the cleft surfaces, if conditioned in the tube forming mill to a shape wherein the radial outer part is V-shaped and the radial inner part is formed with parallel radially extending surfaces, has certain welding characteristics preventing the use of these prior methods.

In our particular process for welding relatively heavy gage tube stock, we feed the tube with its cleft directed upwardly between rolls which guide it under the welding head. The rolls are adjustable laterally whereby the cleft is slightly open as it passes under the first two or three arcs, where the metal is heated on the surfaces of the cleft. However, before the molten metal begins to drip downwardly into the lower part of the cleft the rolls move the edges toward each other, whereby the pasty or tacky metal at the inner part of the cleft is pressed together forming a support for the molten metal running down into the cleft from the upper surfaces. As this metal continues to melt under the next few succeeding arcs, it begins to melt downwardly through this support, in the meantime beginning to form a molten puddle thereabove. In the last two or three arcs the penetration of the molten metal has proceeded down to adjacent the inner end of the cleft, but the lateral pressure of the rolls is forcing the edges together, thereby forcing this molten metal upwardly to increase the depth of the puddle and at the same time bringing the unmelted edges closer together. The tube then leaves the welding head, and the molten metal solidifies in the cleft as it passes under suitable bead rolls which smooth down the weld.

In carrying out tube welding according to our particular process, we have observed what we term a "cascade" effect in the cleft as it moves along under the welding head. This effect is greatest adjacent the latter part of the welding operation, after the first few arcs have produced a sufficient heating to melt down the metal adjacent the outer portions of the cleft. As the guide rolls begin to exert a lateral closing pressure, the molten or fluid metal in the V portion of the cleft is squeezed upwardly, and continued melting adds to the depth of this molten pool or puddle. The arcs striking on the puddle maintain it molten and highly fluid, and the squeezing pressure of the rolls raises the level of the puddle up to approximately the surface of the cleft. The rear or trailing edge of the puddle then apparently cascades rearwardly into the unfilled portion of the cleft, and maintains this rearward motion at about the same rate that the tube is being bodily moved forwardly. Thus under the last two or three arcs, these puddles of fluid metal are cascading rearwardly to fill the gaps in the V part of the cleft therebetween, and the forward motion of the tube brings the puddles to an apparent stable cascading position, whereby as the tube leaves the last arc it has the cleft filled with fluid metal supported by the bottom portion of the cleft which has been forged together by the side rolls.

This squeezing action which the side rolls exert on the cleft surfaces to squeeze the molten metal upwardly in the V portion of the cleft is also of distinct advantage in eliminating porosity and blow holes, since the confluent lateral movement of the two melted beveled surfaces of the cleft may trap hydrogen therein, which trapped hydrogen is released when the metal is squeezed upwardly to the outer surface of the cleft and then cascades rearwardly.

The setting of the side rolls is more or less critical and we have found that best results can be obtained under a nine arc head, when the rolls are set so that the parallel face portions of the cleft are slightly spaced as the tube enters under the first arc, but are forced closed under about the fourth arc before the metal has become sufficiently fluid to run down the opposite sides and either bridge across or drop through. Under the last two or three arcs the rolls force the edges together under considerable pressure, since they have by this time become pasty or tacky, and thus forge the lower lip of the cleft while squeezing and puddling occur thereabove.

By employing the particular method here described, we find that we can effectively weld relatively heavy gauge strip stock, and can obtain a penetration sufficient to withstand the subsequent rolling, swaging and forging operations which such a tube is subjected to, as described in the Spatta Reissue Patent No. 20,103 of September 8, 1936. This welding can be carried on at speeds of from 70 to 100 inches per minute, depending upon the particular stock being welded, and render the process more economical than was heretofore possible with other welding methods.

Other objects and advantages of the present invention will appear more fully from the following detailed description which, taken in conjunction with the accompanying drawings, will disclose to those skilled in the art the particular method and apparatus employed in carrying out the invention.

In the drawings:

Figure 1 is a diagrammatic elevational view showing one form of the apparatus which may be employed in carrying out the present process;

Figure 2 is a sectional view taken substantially on line 2—2 of Figure 1;

Figure 3 is an enlarged sectional view of the tube shown in Figure 2;

Figure 4 is a partial sectional view showing the cleft formation of the tube as it enters under the welding head;

Figures 5 to 12, inclusive, are views corresponding to Figure 4 showing the successive steps in the welding of the cleft as the tube moves under the successive arcs;

Figure 13 is a plan view showing diagrammatically the action occurring under each of the arcs at the seam cleft; and Figure 14 is an elevational view of the cleft illustrating diagrammatically the various steps shown in Figures 4 to 12, inclusive.

Referring now in detail to the drawings, the tube blanks are indicated generally at 5. These blanks, which come from the rolling mill which forms the flat stock into tubular form, are placed upon a rack indicated generally at 6 which is provided with a plurality of supporting rolls 7 which guide the tube into the welding unit. A suitable hydraulic plunger 8 operated from the cylinder 9 is adapted to force the tubes in end butted relation into the feed rolls for the welding unit.

In order to assure that the cleft will be guided under the elongated heating zone formed by the multiple arc atomic hydrogen unit, we provide a pair of seam guide rolls 10 or their equivalent, which are adapted to enter the cleft of the blank and to aline it for proper movement below the welding unit.

The welding unit is indicated generally at 12, and in the preferred embodiment of the invention, comprises a nine arc atomic hydrogen head using tungsten electrodes, each pair of electrodes being slightly displaced laterally in a direction longitudinally of the line of convergence to produce an arc that will be directed down into the cleft, the successive arcs being so spaced as to form a more or less continuous elongated heating zone.

The unit 12 has the individual electrode feeding sleeves 13 controlled by the motors 14 mounted thereabove, and the arcing tips of the electrodes are indicated generally at 15. Below the unit 12 is a supporting frame 17 upon which the head is suitably mounted by means (not shown) whereby the head may be moved forwardly or rearwardly with respect to the frame 17, or may be raised or lowered or rocked upon either longitudinal or transverse axes. This allows an infinite number of adjustments of the welding head 12 with respect to the position of the cleft as it passes therebeneath.

The tubular blank after it leaves the roll 7 is gripped by the first pair of feed rolls 19 which are spaced apart on vertical axes, and which engage the lateral walls of the tube to force the same forwardly under the head. The rolls 19 are mounted for lateral adjustment upon blocks 20, which are slidable transversely of the frame 17, as diagrammatically indicated in Figure 2. Any suitable means for adjusting the rolls may be employed. Three sets of such feed rolls are provided, the second set being indicated at 21 and the third set at 22. Each set of rolls is adjustable on blocks 20 for movement toward or away from each other, thereby varying the lateral pressure upon the side walls of the tube, and consequently varying the gap in the seam cleft in any desired manner. Intermediate the rolls 19 and 21 there is provided a set of intermediate rolls 23 mounted on adjusting blocks 24. The side pressure rolls 23 serve to control the rate at which the cleft is closed as the blank moves beneath the welding head 12. Similarly, a second pair of intermediate rolls or shoes 26 mounted on blocks 27 are provided for further controlling the closing movement of the cleft beneath the welding head. The particular operation of these rolls in the welding of the tube will be described in greater detail hereinafter.

After the tube has moved from beneath the welding head the last set of pressure rolls force the tube between a pair of bead rollers 28 and 29. The upper roller 28 engages the outer surface of the tube at the welded juncture, and smooths down and flattens the bead formed due to upsetting of the weld metal by the side pressure exerted by the rolls carried by frame 17. Disposed within the blank and in line with the rolls 28 and 29 is a pair of internal rollers 30 and 32 carried by a head 33 secured to the forward end of a mandrel 34 extending through the tube, and secured at its rear end to the holder 35 supported upon the bracket 36. The holder 35 has a thin blade section which also serves as a seam guiding means, and which is of such width that the tube can move therepast without interference. The roller 32 supports the mandrel upon the interior of the tube, and the roll 30 is adapted to engage the internal bead formed by the upset of the weld and to roll the same smooth so as to provide a smooth internal surface in the tube.

In order to understand fully the particular welding process disclosed herein, it is necessary to consider, first, the manner in which the weld is formed by a unit of the type such as indicated at 12. This unit, which has come into considerable use in connection with the welding of tubing, forms a high tension arc between a pair of converging electrodes which have their arcing tips slightly offset. This offset produces an S-shaped arc having the major portion of its length disposed in the line of convergence of the electrodes of the multiple arc head. The arc is also arched downwardly thereby lying somewhat adjacent to and in some instances, within the upper portion of the cleft. A stream of low velocity hydrogen gas is fed into the arc and is converted thereby into atomic hydrogen. This reaction and the subsequent recombination of the atomic hydrogen into molecular form produces an intense heat that is directed upon the surfaces of the cleft and causes rapid melting of the stock passing therebeneath. By providing a multiplicity of such arcs an elongated heating zone is produced which has a substantially increasing heating effect upon the stock, the first two or three arcs serving to produce preheating and initial melting of the metal, and the remaining arcs producing successive additional molten metal which flows into the cleft and forms the cast metal or fusion weld for securing the two edges of the cleft together.

Heretofore it has been the practice to employ a shoe of suitable refractory material within the tube beneath the arcs. This shoe prevented molten metal from dropping through the cleft into the interior of the tube and formed a support for the molten metal until such time as it had chilled sufficiently to be self-sustaining. However, such a shoe is objectionable as it causes chilling of the metal at the lower portion of the cleft preventing full penetration of the weld in the cleft, and also is liable to become gummed with metal and to thereby block smooth movement of the tube through the unit.

Another method which has been tried with some success on lighter gauge stock than that contemplated in the present process has been to provide no support beneath the welding unit, but to melt the parallel face edges of a cleft to such condition that the molten metal thereon flows together and forms a liquid bridge between the edges having a capillary strength sufficient to render the same self-supporting until such time as the metal has chilled to such a point that it will not flow. To carry out this process, it is necessary to secure very critical correlation of the rate of melting of the metal, the rate of travel of the tube and the distance between the melted edges in order that the bridge remain self-sustained. If heavier gauge stock is used and a more intense or further elongated arc or heating zone is provided, the metal at the edges of the cleft becomes too molten and too great a quantity of molten metal is present to form a self-sustaining bridge. The molten metal falls through the cleft into the interior of the tube. The increased heat necessary to weld the stock of heavier gauge in order to secure full penetration, as well as the fact that an elongated heating zone of greater length than heretofore found necessary, is required, together with the fact that the force of the arc tends to blow the metal downwardly through the cleft has prevented successful application of this method to welding of stock of the gauge which we contemplate employing. The length of travel of the tube beneath the welding unit when heavy gauge stock is used is also increased as well as the time which it takes to move this distance, and consequently the metal remains molten for a longer period, and a greater amount or mass of molten metal is necessary, which in open cleft welding as provided in previous processes, does not produce satisfactory welds, as far as our experience is concerned.

Our present process is based largely upon two factors which have heretofore not been thoroughly considered in this connection. First of all, we contemplate conditioning the edges of the blank in a predetermined manner in the rolling mill prior to the time that the tube is introduced into the welding unit. This edge conditioning, when carried out according to our disclosure, is one of the factors determining to a large extent the success of welding when heavier gauge stock is used. Another factor is the control of the lateral pressure upon the tube during the passage through the elongated welding zone, whereby we may materially control and increase the efficiency of the weld without relying upon self-support of a bridge of molten metal in the cleft or the use of a supporting shoe.

Our present process may be described as being operated upon what we have termed the "cascade" principle. In such a process the molten metal is formed at the juncture of the peripheral surface of the tube, and the radial outer defining wall of the cleft. This molten metal is in successive stages melted into larger and larger masses that are supported upon the diverging walls of the cleft itself until such time as they are about to converge together at the center of the cleft and adjacent its lower end. However, by this time, the side rolls have brought the lower surfaces of the cleft to a substantially closed position so that a support is formed for this mass of molten metal and this portion of the cleft serves to support the molten metal puddle. The unmelted portion of the cleft is gradually being converted to a molten condition due to the heat of the molten metal thereabove. However, at the same time, the lateral compression produces a closing of the effective cross sectional area of the cleft, and thereby produces an increase in height of the puddle of molten metal formed therein. This metal in the puddle has only one direction in which it can flow, and that is rearwardly into the more open portion of the cleft which is gradually being closed. As a result, the last two or three arcs produce pools or puddles of molten metal which have their hydraulic head increased by the squeezing action of the side rolls to an extent such that the metal in the trailing end of the puddle cascades rearwardly of the seam into the unfilled portions thereof, and thereby flows down and a thin film thereof becomes attached to the unmelted portions of the seam edges as they close to produce a condition whereby, as this portion of the tube moves into the place occupied formerly by the puddle, a second puddle is formed which again cascades downwardly. In actual practice, the action is a smooth uninterrupted action, and the puddle under the last two or three arcs appears to be more or less stationary due to the fact that it is travelling rearwardly at a rate substantially equal to the forward travel of the tube, and therefore remains at a relatively stationary position with respect to the arc. This rearward cascading movement of the molten metal can be observed closely only by an experienced operator, and from experiments which we have conducted, it appears that the last two, and probably the last three arcs, are acting upon the cleft which has been preheated up to the melting temperature by the previous arcs so that these last two or three arcs form the puddles that cascade in the manner described. Of course, it must be remembered that the arcs alone do not produce this cascading action, but that it is a conjoint action of the arcs acting at predetermined points of the cleft and the transverse movement of the walls of the cleft produced by the setting of the feeding and pressure rolls through which the tube is passing. The relationship between these rolls and the temperature curve of the edges as they pass through the successive arcs must be accurately correlated in order that the amount of melting produced by each of the arcs, together with the movement of the edges under the influence of the rolls, will produce the required building up of the supported puddles and the rearward cascade or flow of the trailing edges of these puddles into the closing portion of the seam so that a dense weld of substantially full penetration is produced.

It is believed that the cascade principle outlined above can be more readily understood in connection with a description of the action as diagrammatically indicated in Figures 4 to 14, inclusive, and reference is now made to these figures.

In Figure 4 we have disclosed the blank 5 in section with the edges of the cleft in the condition in which they leave the rolls of the tube forming machine. The cleft indicated at 40 is defined by a substantially Y-shaped portion comprising the parallel edges 42 at the base of the cleft and the outwardly flaring or beveled edges 43 adjacent the upper portion of the cleft. This view is a substantial full scale view of the blank, and the spacing between the edges 42 is approximately the spacing present as the blank is fed to the first pressure or feed roll 19.

Figure 5 shows a section of the tube or blank 5 as it passes beneath the second arc 15 of the multiple arc head 12. This arc produces a heating at the upper surfaces of the portions 43 of the cleft, and produces a small amount of melting indicated at 45 in Figures 5, 13 and 14. The preheating accomplished under the first arc has already heated the metal at the junction 43 and the external periphery of the blank to a point whereby the second arc produces a slight globule of molten metal at these edges.

In Figure 6 we have shown a cross section of the tube as it passes beneath the third arc of the head 12. It will be noted from a comparison of Figures 4, 5 and 6 that as the tube passes through the pressure rolls 19, the cleft 40 is being narrowed from the position shown in Figure 4 to that shown in Figure 6 so that the parallel facing portions 42 thereof are being brought closer toward each other, and consequently the tube is being slightly reduced in diameter as it passes forwardly under the head. At the same time that the arcs are playing upon the cleft surfaces, a bath of low velocity hydrogen gas is directed over the entire surface being welded, and passes downwardly through the cleft. This bath of hydrogen gas is shown diagrammatically at 46 in Figures 5, 6 and 7, but has been omitted in the remaining figures for the sake of clarity, although of course the entire heating zone is covered with this reducing atmosphere. In Figure 6 the third arc has succeeded in increasing the heat on the surfaces 43 to an extent such that the globule 45 has increased to the size indicated at 47 in Figure 6, and has progressed partially down the inclined sides 43 of the cleft.

In Figure 7 a section of the tube is shown as it passes beneath the fourth arc in the multiple arc head 12. At this point the temperature has been increased to an extent such that the major portion of the beveled surfaces 43 have been melted to produce the portion shown at 48 in Figure 7, which has widened or melted back the edges 43 on both sides of the cleft, and at the same time has produced a molten condition within the cleft substantially as indicated in Figures 13 and 14.

These latter figures are diagrammatic only, and indicate the relative amount of melting and welding which occurs under each of the arcs, the arcs being indicated on the drawing by the spaced vertical lines. The condition of the edges under each of the arcs is thereby indicated. It is to be understood that the portions of the cleft shown intermediate the arcs will not have the formation shown in these two figures, but for the sake of clarity, these figures are drawn to indicate the succesive amount of melting of the metal of the left surfaces and the flowing action of this molten metal beneath each of the arcs.

It will also be noted in Figure 7 that the tube has now been moved forward to a position where it is entering the side rolls 21, and consequently the cleft 40 has been still further reduced in area by the lateral movement of the cleft surfaces toward each other.

In Figure 8 the tube is shown in section as it appears under the fifth arc of the multiple arc head. In this position the cleft surfaces have been moved very close together and the melting of metal has proceeded down to the junction of the parallel faces 42 and the faces 43, the entire portion of the faces 43 being in the molten condition, indicated generally at 49. The two globules 49 at this instant are about in a position to run together or converge to form a single globule, while the inner faces of the cleft are in close proximity, being only a few thousandths of an inch apart.

In Figure 9 the tube is shown as it appears in section under the sixth arc where the two globules 49 of the preceding figure have run together to form the globule 50, and the two edges 42 have been pressed toward each other so that they define therebetween a space insufficient to allow the metal to pass therebetween and form a more or less pasty or tacky metallic condition beneath the molten puddle formed by the converging portions 50. These edges 42 are now in a substantially pure ferrite state, and capable of forming an incipient fusion weld.

The condition in the cleft under the seventh arc is illustrated diagrammatically in Figure 10, in which the two globules 50 which tended to converge under the sixth arc having now been forced together to form a puddle 52, and a portion of this puddle has cascaded or moved rearwardly as shown by the trailing edge 53 in Figures 13 and 14, and moves in a thin sheet downwardly between the edges 42 as these anterior portions of the edges are being pressed together by the rolls 21 and the rolls 26. Under such conditions this trailing or cascading rear sheet of molten metal moves downwardly into the cleft to wet the edges 42 as the tube moves forwardly beneath the head and these edges are being simultaneously forced together by the side pressure rolls to raise the level of the puddle 52, and thereby increase its height to an extent such that the rear portion of the puddle tends to cascade rearwardly in a direction opposite to the movement of the tube to fill the space between the edges 42 as these edges are being brought together under pressure.

In Figure 11 the condition in the cleft is illustrated as the blank moves under the next to the last arc. In this position the side pressure rolls have brought the two surfaces 42 together, thereby compressing the thin sheet of the trailing edge 53 therebetween to bind the two faces 42 together, and at the same time, the puddle 52 has been built up into a puddle such as shown at 54 in Figure 11 due to the lateral pressure which tends to cause cascading of the trailing edge of this puddle, as indicated at 55 in Figures 13 and 14. This substantially completely fills the cleft with molten metal, and the trailing edges of the puddles 52 and 54 complete the filling of such portions of the cleft as have not been filled directly beneath the arcs.

In Figure 12 we show the condition of the weld as the tube leaves the ninth or last arc. The cascading effect produced by the side pressure which builds up the height of the puddle and causes the rear or trailing portion of the puddle to flow backwardly or cascade into the unfilled portion of the cleft has now completed the filling of the cleft, and has also forced or extruded a portion of the fluid metal outwardly between the surfaces formerly comprising the faces 42 of the cleft. This extruding of the metal by the side pressure rolls is indicated at 57 in Figures 12 and 14, and the puddle itself has been forced up to a height greater than the thickness of the blank itself, as indicated at 58. Thus as the tube leaves the ninth arc the cleft has been completely filled with molten metal due to the cascading rearwardly of the trailing edges of the puddles under the last two or three arcs, which causes thin films of this metal to flow into the unfilled portions of the cleft, and to be compressed therebetween as the lateral pressure of the rolls 21, 22 and 26 forces the edges of the seam together with the metal therebetween to form a true cast weld having substantially complete penetration.

Of course, it is to be understood that under the varying conditions encountered in the welding of tubing at the speeds desired, it may sometimes happen that the faces 42 move toward each other to an extent such that the trailing edges of the puddles 52 and 54 do not have an opportunity to flow therebetween by this rearward cascading movement before the faces 42 have been brought together. However, even under such conditions, a good weld is secured due to the fact that the faces 42 have been heated by the passage of the atomic hydrogen therebetween, and are in a somewhat pasty or tacky condition as they are being forced toward each other thereby forming a fusion weld even if the thin sheet of liquid metal is not cascaded therebetween before these faces come into abutment. Under favorable conditions, however, the last two or three puddles formed by the corresponding arcs will produce a thin film of molten metal between these edges due to this rearward cascading from the top of the trailing edge of the puddle so that the closing of the cleft is produced with molten metal on substantially the entire area of the surfaces defining the cleft.

It is believed apparent that we have disclosed herein a welding process which is capable of welding relatively heavy gauge metal at suitable speeds, and which produces a satisfactory weld throughout substantially the entire thickness of the cleft.

We do not intend to be limited to the particular apparatus herein shown and described, but only insofar as is necessary to carry out our new welding process, and the invention is therefore to be considered as defined by the scope and spirit of the appended claims.

We claim:

1. A method of welding a Y-shaped cleft of a tubular blank which comprises passing said cleft through an elongated heating zone, laterally pressing said blank to close said cleft approximately at the center of its movement through said zone, and further laterally pressing the cleft edges of said blank toward each other at a rate such that as the molten metal reaches the parallel surfaces of the cleft, the cleft is substantially closed to provide a support and to force molten metal upwardly in the flaring portion of said cleft to produce puddles of molten metal of a depth such that they extend above the cleft and the trailing edge of the puddles cascade rearwardly toward the unfilled portion of the cleft as the blank moves forwardly.

2. A method of welding a tubular blank having its cleft edges formed with inner parallel wall portions and outer diverging wall portions, which comprises initially heating the cleft from the outer surface thereof inwardly with the parallel edges spaced slightly apart, moving said parallel portions into abutment as the metal from the diverging wall portions tends to flow therebetween at a rate such that as the molten metal reaches said parallel portions the cleft is substantially closed to provide a support therefor, and increasing the pressure between said parallel wall portions as the metal thereof tends to melt downwardly therethrough to support said molten metal and to force it upwardly into puddles that cascade rearwardly with respect to movement of the blank into the unfilled portions of the cleft.

3. A method of welding a tubular blank having a Y-shaped cleft which comprises feeding said blank with the cleft uppermost beneath an elongated welding zone, melting the beveled surfaces of the cleft and forming globules of molten metal thereon which tend to run inwardly through said cleft, simultaneously forcing the edges of said cleft toward each other at a rate such that as said molten metal reaches the parallel surfaces of said cleft the cleft is substantially closed to thereby form a molten puddle of metal in said cleft, increasing the lateral pressure on the blank to thereby cause the trailing edge of the puddle to cascade rearwardly into the unfilled portion of the cleft as the blank moves forwardly, and maintaining the forward portion of said puddle at a height greater than the thickness of said cleft by lateral pressure as the blank leaves the welding zone under said head.

4. In a method of welding a Y-shaped cleft of a tubular blank by producing an elongated heating zone in line with the flaring cleft of the tube as it is fed therebeneath, the novel procedure which comprises melting the upper edges of the cleft and flowing the molten metal downwardly therein, simultaneously moving the cleft edges toward each other at a rate such as to catch the molten metal and support it at the radial inner portion of the cleft and to form a molten puddle above the support, and raising the height of said puddle by increasing the lateral pressure to a point where the trailing edge cascades rearwardly as a thin film into the lower portion of the cleft as the edges come together whereby said edges are wet with molten metal from said puddle as they are forced together at the base of the cleft to form said support.

5. A method of welding a Y-shaped cleft in a tubular blank by means of an elongated heating zone, which comprises passing said blank beneath said zone, heating and melting the flaring edges of said cleft in the initial portion of said zone and rendering the inner portion of the cleft edges plastic, forming convering molten globules on said flaring edges in the intermediate portion of said zone and simultaneously forcing the plastic inner portions of said edges toward each other to form a support for said globules, and forcing up molten puddles under the arcs in the latter portion of said zone having the trailing edges thereof cascading rearwardly with respect to the movement of the blank to fill up the cleft as said inner edges move into engagement.

JOSEPH H. GETTIG.
GEORGE SPATTA.